US007584600B2

(12) United States Patent
Klingels

(10) Patent No.: US 7,584,600 B2
(45) Date of Patent: Sep. 8, 2009

(54) GAS TURBINE, IN PARTICULAR AIRCRAFT ENGINE AND METHOD FOR GENERATING ELECTRICAL ENERGY IN A GAS TURBINE

(75) Inventor: Hermann Klingels, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 44 days.

(21) Appl. No.: 10/580,743

(22) PCT Filed: Nov. 5, 2004

(86) PCT No.: PCT/DE2004/002444

§ 371 (c)(1),
(2), (4) Date: May 26, 2006

(87) PCT Pub. No.: WO2005/054645

PCT Pub. Date: Jun. 16, 2005

(65) Prior Publication Data

US 2007/0089420 A1 Apr. 26, 2007

(30) Foreign Application Priority Data

Nov. 29, 2003 (DE) ................... 103 55 917

(51) Int. Cl.
*F02C 6/08* (2006.01)
*F02C 7/32* (2006.01)
*F02C 7/36* (2006.01)

(52) U.S. Cl. ............... 60/39.183; 60/802; 60/39.21

(58) Field of Classification Search ........... 60/39.183, 60/802, 39.21
See application file for complete search history.

(56) References Cited

U.S. PATENT DOCUMENTS

| 2,949,731 | A | * | 8/1960 | Hambling | 60/39.183 |
| 3,145,532 | A | | 8/1964 | Moss | 60/39.14 |
| 3,514,945 | A | | 6/1970 | Austin | 60/39.16 |
| 4,077,202 | A | * | 3/1978 | Schutze | 60/788 |
| 4,864,812 | A | * | 9/1989 | Rodgers et al. | 60/802 |
| 5,143,329 | A | | 9/1992 | Coffinberry | 244/209 |
| 5,174,109 | A | * | 12/1992 | Lampe | 60/788 |
| 5,285,626 | A | * | 2/1994 | Leeson | 60/39.183 |
| 5,694,765 | A | | 12/1997 | Hield et al. | 60/39.163 |

FOREIGN PATENT DOCUMENTS

| DE | 41 31 713 C2 | 4/1993 |
| EP | 0 200 178 A1 | 11/1986 |
| EP | 1 186 761 A2 | 3/2002 |

* cited by examiner

*Primary Examiner*—Ted Kim
(74) *Attorney, Agent, or Firm*—Davidson, Davidson & Kappel

(57) ABSTRACT

A gas turbine, in particular an aircraft engine and to a method for generating electrical energy in a gas turbine is provided. The gas turbine comprises at least on engine core (18), in which a shaft (19) produces a shaft output. The turbine is equipped with means that generate electrical energy both from the shaft output produced by the engine core (18) and from the compressed air that is dissipated by the engine core (18).

16 Claims, 3 Drawing Sheets

GAS TURBINE, IN PARTICULAR AIRCRAFT ENGINE AND METHOD FOR GENERATING ELECTRICAL ENERGY IN A GAS TURBINE

FIELD OF THE INVENTION

The present invention relates to a gas turbine and a method for generating electrical power in a gas turbine, and an aircraft engine in particular.

BACKGROUND

In addition to propulsion for moving the aircraft forward, aircraft engines, either civil aircraft engines or military aircraft engines, also generate power for supplying attachments or auxiliaries of the gas turbine or for supplying aircraft-related systems such as the air conditioning system, for example. For generating power for supplying the attachments or auxiliaries and the aircraft-related systems it is known from the related art to draw mechanical power from a core engine of the gas turbine which is used, for example, to drive pumps and generators. DE 41 31 713 C2 describes an aircraft engine, for example, in which shaft power is drawn from a core engine and this shaft power is supplied to auxiliaries.

In aircraft development, a definite trend can be observed to the effect that increasingly more electrical power is required in the aircraft. The reason for this is that hydraulically and pneumatically operated devices or power units in the aircraft are replaced by electrically operated devices and that more and more power is needed per aircraft seat. Therefore, the aircraft engines must provide more and more electrical power.

For generating electrical power it is known from the related art to couple the shaft of the core engine of a gas turbine to a generator so that the mechanical shaft power drawn at the shaft may be converted into electrical power. However, this type of supply or generation of electrical power has the disadvantage that a displacement of the operating characteristic curve of the gas turbine in the characteristics map of the high-pressure compressor toward the surge limit can be noted. The surge limit in the characteristics map of the high-pressure compressor delimits the stable operating range of the gas turbine from the unstable operating range of the gas turbine. In order to ensure stable operation over the entire operating range and thus the load range of the gas turbine, a certain surge limit margin must be maintained. The effect that a displacement of the operating characteristic curve toward the surge limit can be observed increases with decreasing performance of the gas turbine, i.e., instabilities may occur in the lower load range of the gas turbine, i.e., during partial load operation.

In order to ensure reliable operation of the gas turbine even in its partial load range under the above-mentioned aspects, the approach of the related art is to design the gas turbine, its core engine in particular, to have a greater surge limit margin. This results in a greater overall length of the high-pressure compressor of the core engine in particular, as well as in a greater number of stages, a greater number of blades, and thus in greater weight and higher costs overall. If, however, the high-pressure compressor of the core engine is not designed to have a greater surge limit margin, then, according to the related art, the only alternative remains to lower the operating characteristic curve of the gas turbine, the core engine in particular, to the extent that a sufficient surge limit margin is maintained even during partial load operation. However, this has the effect that during full load operation the efficiency optima can no longer be achieved, resulting in lower efficiency.

SUMMARY OF THE INVENTION

Based on the aforementioned, an object of the present invention is to create a novel gas turbine, a novel aircraft engine in particular, and a novel method for generating electrical power in a gas turbine, an aircraft engine in particular.

In accordance with the present invention, a gas turbine comprises a core engine including a high pressure compressor and a shaft connected thereto for driving said high speed compressor. An electrical power generator generates electrical power from the shaft and from compressed air drawn from the high-pressure compressor.

According to the present invention, the gas turbine has means which generate electrical power from the shaft power transmitted from the core engine and which generate electrical power from compressed air drawn from the core engine.

According to an advantageous refinement of the present invention, the means generate the electrical power in a high load range of the core engine exclusively from the mechanical shaft power drawn from the core engine. However, in a lower load range of the core engine, the means generate the electrical power from the mechanical shaft power drawn from the core engine and from the compressed air drawn from the core engine.

BRIEF DESCRIPTION OF THE DRAWINGS

Without being limited to them, exemplary embodiments of the present invention are explained in greater detail on the basis of the drawing.

DETAILED DESCRIPTION

The present invention is subsequently described in greater detail with reference to FIGS. 1 through 3.

Figure 1:
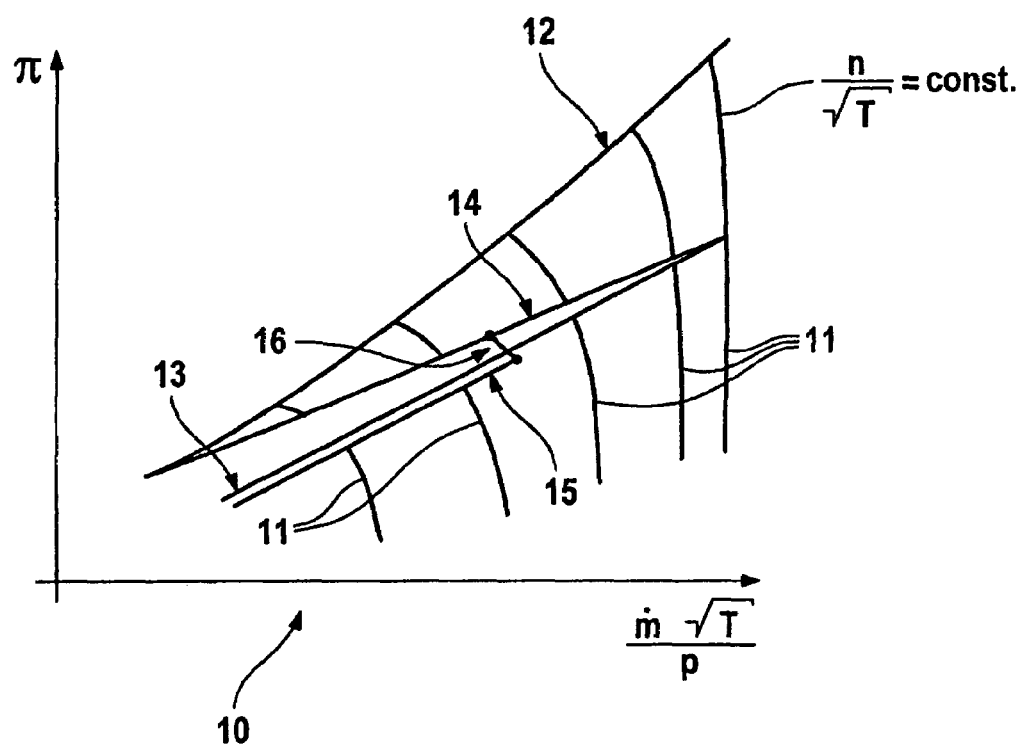
FIG. 1 shows a schematic representation of a characteristics map of a high-pressure compressor of a gas turbine, namely a core engine of the gas turbine.

FIG. 1 shows a characteristics map of a high-pressure compressor of a core engine of a gas turbine. In the diagram of FIG. 1, $\pi$ is the compression ratio or the pressure ratio of the high-pressure compressor, $\dot{m}$ is the mass flow through the high-pressure compressor, T is the temperature, $\rho$ is the pressure inside the high-pressure compressor, and n is the rotational speed of same. The reference numeral 11 indicates lines in characteristics map 10 in which the ratio $n/\sqrt{T}$ is constant. Moreover, in characteristics map 10 according to FIG. 1, the reference numeral 12 indicates the surge limit of the high-pressure compressor of the core engine.

In the case in which the gas turbine is exclusively used for generating propulsion for the aircraft, except for the normal attachments—such as the fuel pump and the oil pump—no further shaft power of the high-pressure compressor or the core engine is drawn and the high-pressure compressor of the gas turbine is operated with the operating characteristic curve which is indicated in FIG. 1 using the reference numeral 13. For operating characteristic curve 13 there is a sufficient margin from surge limit 12 over the entire characteristics map of the high-pressure compressor. However, if mechanical shaft power is drawn at the shaft of the high-pressure compressor, the operating characteristic curve in the characteristics map is displaced toward the surge limit; an operating characteristic curve of the high-pressure compressor when shaft power is drawn is indicated in FIG. 1 using the reference numeral 14.

It is apparent in FIG. 1 that when additional power is drawn, e.g., for driving electric units, the effect of the displacement of the operating characteristic curve toward surge limit 12 increases while the power of the high-pressure compressor decreases. In particular in the lower load range of the high-pressure compressor and thus the core engine, instabilities in the operation of the high-pressure compressor have to be expected when mechanical shaft power is drawn.

Within the scope of the present invention, a gas turbine and a method for generating and removing electrical power in a gas turbine are proposed, with the aid of which the displacement, described in connection with FIG. 1, of operating characteristic curve 13 in the direction of operating characteristic curve 14 may be avoided.

Before preferred exemplary embodiments of the present invention are described below in greater detail with reference to FIGS. 2 and 3, it should be pointed out that, according to the present invention, mechanical shaft power is drawn from the core engine and this drawn shaft power is converted into electrical power and that compressed air is also drawn from the core engine and the pneumatic energy contained in the compressed air is also converted into electrical power. It is therefore the object of the present invention to generate the electrical power in a high load range of the core engine exclusively from the mechanical power drawn. In contrast, the necessary electrical power is generated in a lower load range from the mechanical shaft power drawn and from the pneumatic energy contained in the compressed air. Due to the withdrawal of compressed air in the lower load range of the high-pressure compressor or the core engine, the operating characteristic curve of the high-pressure compressor may be influenced in such a way that a sufficient margin from surge limit 12 is maintained in the lower load range.

The reference numeral 15 in FIG. 1 indicates an operating characteristic curve of the high-pressure compressor which is established when the present invention is used. Switching between the two states, which are to be differentiated in principle, takes place in a middle section 16 of operating characteristic curve 15, the electrical power being generated in a first state exclusively by drawing mechanical power and the electrical power also being generated in a second state from the pneumatic energy contained in the drawn, compressed air.

Figure 2:
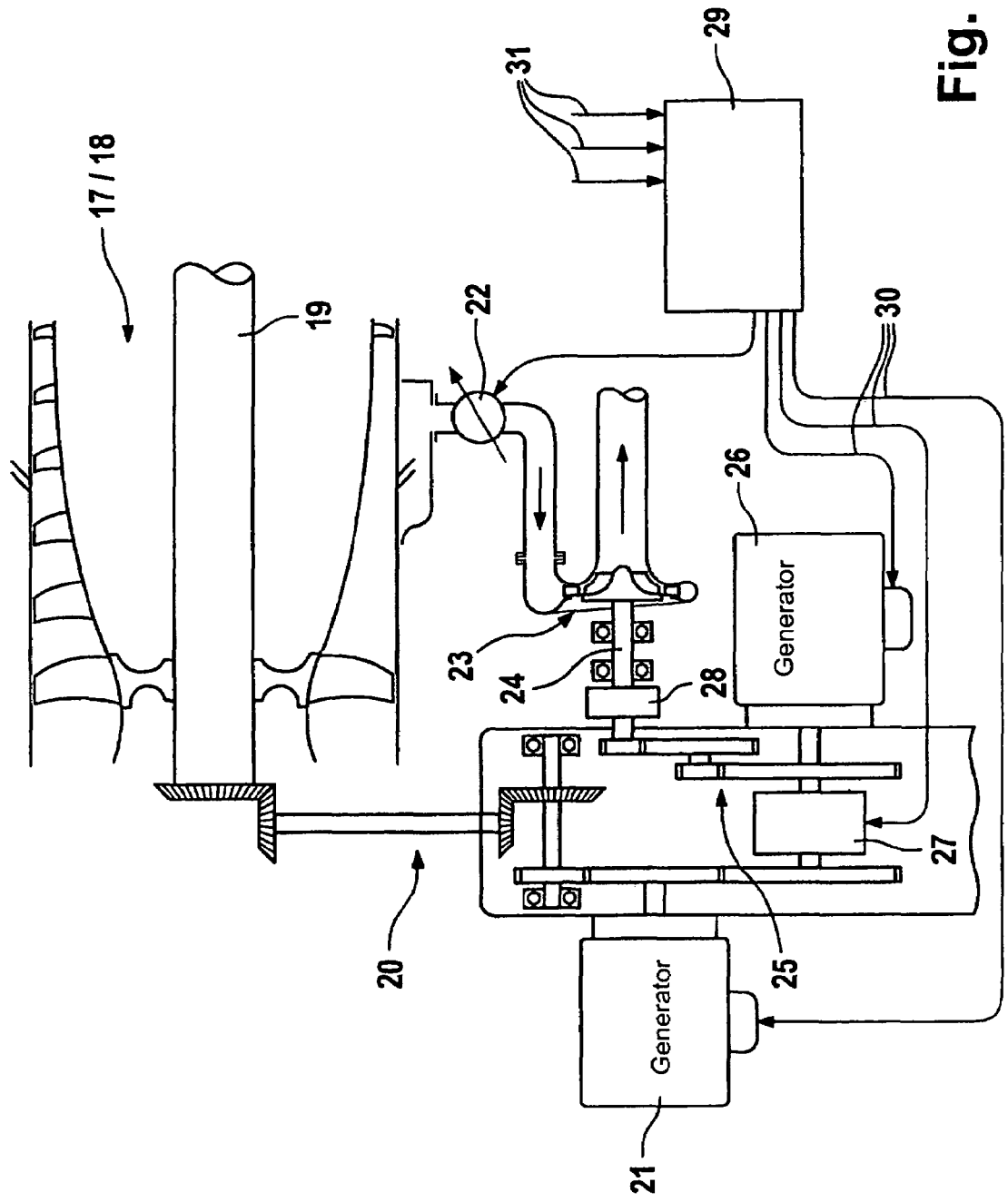
FIG. 2 shows a block diagram for clarifying a first embodiment of the present invention.

FIG. 2 shows a highly schematic representation of a first preferred exemplary embodiment of a gas turbine according to the present invention. FIG. 2 shows a high-pressure compressor 17 of a core engine 18 including a shaft 19 of high-pressure compressor 17. The mechanical power of shaft 19 is picked up at shaft 19 of high-pressure compressor 17 of core engine 18 via a gear 20 and is transferred to a generator 21 which generates electrical power from the mechanical power. Within the scope of the present invention, compressed air is drawn from the high-pressure compressor 17 via a controllable valve 22. The compressed air is supplied to an air turbine 23, air turbine 23 generating mechanical power from the pneumatic energy contained in the compressed air and drives a shaft 24. Shaft 24 is connected to a second generator 26 via a second gear 25. Second generator 26 ultimately converts the pneumatic energy contained in the compressed air, after its conversion into mechanical power by air turbine 23, into electrical power.

As is apparent in FIG. 2, gear 20 assigned to first generator 21 and second gear 25 assigned to second generator 26 are connectable via a clutch 27. Clutch 27 is controllable and either decouples gears 20 and 25 from one another or couples them together. A freewheel 28 is integrated into shaft 24 which is driven by air turbine 23.

In an upper load range of the high-pressure compressor, in which the electrical power is generated exclusively by drawing mechanical power of shaft 19 of high-pressure compressor 17 according to the present invention, both gears 20 and 25 are coupled to one another via clutch 27, valve 22 is closed, and shaft 24 is decoupled from second gear 25 via freewheel 28. In this state, first generator 21 and second generator 26 are exclusively driven by shaft 19 of high-pressure compressor 17 and both generators 21 and 26 convert the drawn mechanical power into electrical power. In contrast, in a lower load range of high-pressure compressor 17, clutch 27 is disengaged and both gears 20 and 25 as well as both generators 21 and 26 are decoupled from one another. Valve 22 is open and compressed air is drawn from high-pressure compressor 17 and supplied to air turbine 23. Freewheel 28 couples shaft 24 to second gear 25 so that the mechanical power generated by air turbine 23 from the compressed air can be transferred to second generator 26 for generating electrical power. In the lower load range, generator 21 is driven, according to the exemplary embodiment in FIG. 1, by shaft 19 of high-pressure compressor 17 via gear 20 and generator 26 is driven by air turbine 23, to which the compressed air drawn is supplied via gear 25.

Switching between these two states of high-pressure compressor 17 takes place via control means 29. In the exemplary embodiment shown, control means 29 is designed as an ECU (energy control unit). Valve 22, clutch 27, and both generators 21 and 26 are controllable via control means 29 as it is indicated by arrows 30 in FIG. 2. Switching between the two operating states for generating electrical power takes place either on the basis of criteria stored in control means 29 or on the basis of measured values 31 which are conveyed to control means 29. Measured values 31 may be, for example, the measured compression ratio $\pi$, measured rotational speeds n, or measured temperatures T. Criteria on the basis of which switching between the two operating states or connection or disconnection of air turbine 23 takes place for generating electrical power by withdrawing compressed air from high-pressure compressor 17 may be calculated from the measured values in control means 29.

Figure 3:
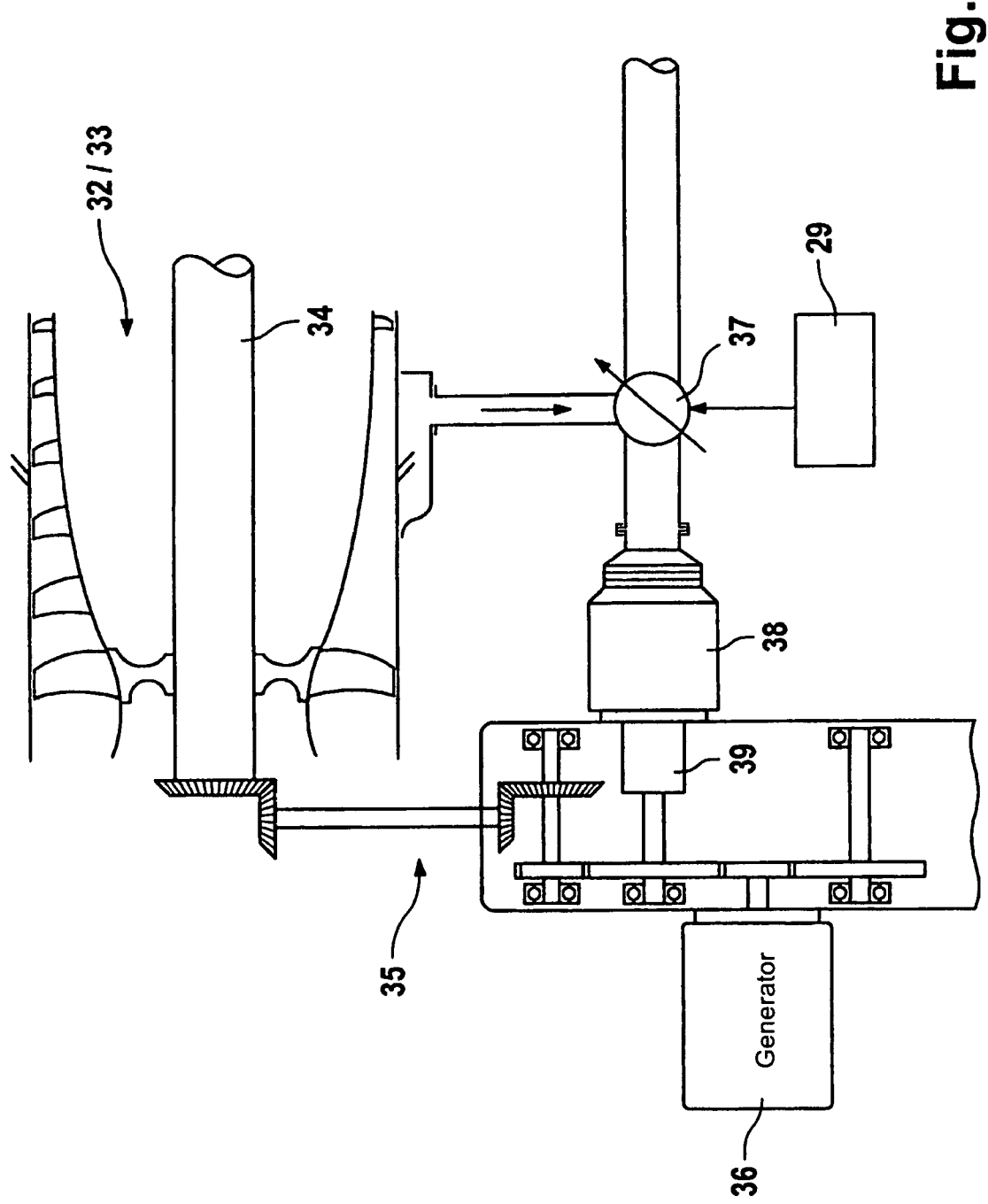
FIG. 3 shows a block diagram for clarifying a second embodiment of the present invention.

FIG. 3 shows a second exemplary embodiment of the present invention. FIG. 3 again shows a high-pressure compressor 32 of a core engine 33 having a shaft 34, mechanical power being drawn from shaft 34 via a gear 35 and applied to a generator 36 or multiple generators for generating electrical power. In the exemplary embodiment in FIG. 3, compressed air may also be drawn from high-pressure compressor 32 via a controllable valve 37, the compressed air being supplied to an air turbine 38 of the engine, also known as an engine starter. Air turbine 38 may also be used as a starting device. Air turbine 38 or the starter in turn converts the energy contained in the compressed air into mechanical power and drives a shaft using this mechanical power. Via freewheel 39, the shaft driven by air turbine 38 may be coupled to gear 35 or be decoupled therefrom. The approach in connection with the exemplary embodiment shown in FIG. 3 is that during partial load operation of high-pressure compressor 32 the compressed air is supplied to air turbine 38 via valve 37. Valve 37 is controllable via control means 29. If an input speed of air turbine 38 is higher than a rotational speed of a shaft on which air turbine 38 is situated, freewheel 39 engages and transfers the generated mechanical power to gear 35 and thus ultimately to generator 36 for generating electrical power.

Both exemplary embodiments have in common that compressed air is drawn from the high-pressure compressor in the lower load range and that electrical power is generated from the energy contained in the compressed air. Due to the withdrawal of compressed air, the operating characteristic curve of the high-pressure compressor is influenceable in such a way that the operating characteristic curve moves away from the surge limit and an adequate surge limit margin may be maintained even in the lower load range of the high-pressure compressor.

What is claimed is:

1. A gas turbine, comprising:
a core engine including a high pressure compressor and a shaft connected thereto for driving said high pressure compressor;
an electrical power generator connected to the shaft generating electrical power from the shaft, the electrical power generator further including an air turbine receiving compressed air drawn from the high pressure compressor to generate electrical power, the electrical power generator including a first generator and a first coupling apparatus, the first coupling apparatus coupling the first generator to the shaft so that the first generator is capable of generating electrical power from the mechanical shaft power drawn from the core engine via the shaft, the electrical power generator further including a second generator and a second coupling apparatus coupled to the second generator, the second coupling apparatus being arranged and configured such that the second coupling apparatus is capable of removably coupling the second generator to the air turbine in a first operating state and is capable of removably coupling the second generator to the shaft in a second operating state so that the second generator is capable of generating electrical power from the mechanical power generated by the air turbine or alternatively the mechanical shaft power drawn from the core engine via the shaft, the first coupling apparatus being arranged and configured such that the first coupling apparatus is capable of coupling the first generator to the shaft when the second generator is coupled to the air turbine via the second coupling apparatus.

2. The gas turbine as recited in claim 1, wherein the second operating state is a high load range of the core engine and the electrical power generator generates electrical power in the high load range of the core engine exclusively from mechanical shaft power drawn from the core engine via the shaft.

3. The gas turbine as recited in claim 1, wherein the first operating state is a lower load range of the core engine and the electrical power generator generates electrical power in the lower load range of the core engine from the mechanical shaft power drawn from the core engine via the shaft and from pneumatic energy contained in the compressed air.

4. The gas turbine as recited in claim 1, further comprising a controller, wherein the controller, as a function of the load range of the core engine, automatically controls the second coupling apparatus such that the second coupling apparatus couples and uncouples the second generator from the air turbine.

5. The gas turbine as recited in claim 1, wherein the first coupling apparatus includes a first gear and the first generator is connected to the shaft via the first gear.

6. The gas turbine as recited in claim 5, wherein the second coupling apparatus includes a second gear and the second generator is connected to the air turbine via the second gear.

7. The gas turbine as recited in claim 6 wherein the second coupling apparatus further includes a freewheel assigned to the second gear which cooperates with the air turbine.

8. The gas turbine as recited in claim 7, wherein the second coupling apparatus further includes a controllable clutch and the first and second generators are connectable to one another via the controllable clutch in the second operating state the second operating state being an upper load range of the core engine, the first and second generators being driven in the upper load range of the core engine exclusively by the shaft.

9. The gas turbine as recited in claim 8, wherein the first and second gears are connected to one another via the controllable clutch and the freewheel decouples the air turbine.

10. The gas turbine as recited in claim 8 wherein the first operating state is a lower load range of the core engine and the first and second generators are decoupled in the lower load range of the core engine, the first generator being driven exclusively by the shaft and the second generator being driven exclusively by the air turbine.

11. The gas turbine as recited in claim 10, wherein the controllable clutch decouples the first and second generators by decoupling the first and second gears from one another, and the freewheel couples the air turbine with the second generator via the second gear.

12. The gas turbine as recited in claim 1, wherein the electrical power generator is connected to the shaft via a gear, the electrical power generator generating electrical power from the mechanical shaft power drawn from the core engine via the shaft.

13. The gas turbine as recited in claim 1 wherein the first operating state is a lower load range of the core engine and the first and second generators are decoupled in the lower load range of the core engine, the first generator being driven exclusively by the shaft and the second generator being driven exclusively by the air turbine.

14. The gas turbine recited in claim 1 wherein the first coupling apparatus and the second coupling apparatus are arranged and configured such that in the second operating state the second coupling apparatus couples the second generator to the shaft via the first coupling apparatus.

15. A gas turbine, comprising:
a core engine including a high pressure compressor and a shaft connected thereto for driving said high pressure compressor;
an electrical power generator connected to the shaft generating electrical power from the shaft, the electrical power generator further including an air turbine receiving compressed air drawn from the high pressure compressor to generate electrical power, the electrical power generator including a first generator and a first coupling apparatus, the first coupling apparatus coupling the first generator to the shaft, the first generator generating electrical power from the mechanical shaft power drawn from the core engine via the shaft in a lower load range and a higher load range, the electrical power generator further including a second generator and a second coupling apparatus coupled to the second generator, the second coupling apparatus being arranged and configured such that the second coupling apparatus is capable of removably coupling the second generator to the air turbine in the lower load range and is capable of removably coupling the second generator to the shaft in the higher load range so that the second generator is capable of generating electrical power from the mechanical power generated by the air turbine in the lower load range and from the mechanical shaft power drawn from the core engine via the shaft in the higher load range.

16. A gas turbine, comprising:
a core engine including a high pressure compressor and a shaft connected thereto for driving said high pressure compressor;
an electrical power generator connected to the shaft generating electrical power from the shaft, the electrical power generator further including an air turbine receiving compressed air drawn from the high pressure compressor to generate electrical power, the electrical power generator including a first generator and a first coupling apparatus, the first coupling apparatus coupling the first generator to the shaft, the first generator generating electrical power from the mechanical shaft power drawn from the core engine via the shaft, the electrical power generator further including a second generator and a second coupling apparatus coupled to the second generator, the second coupling apparatus being arranged and configured such that the second coupling apparatus is capable of removably coupling the second generator to the air turbine so that the second generator is capable of generating electrical power from the mechanical power generated by the air turbine; and
a controller, the controller controlling the second coupling apparatus such that the second coupling apparatus couples and uncouples the second generator from the air turbine so that an operating characteristic curve of the gas turbine maintains a predetermined surge limit margin.

\* \* \* \* \*